United States Patent [19]
Itoh et al.

[11] Patent Number: 5,630,038
[45] Date of Patent: May 13, 1997

[54] METHOD AND APPARATUS FOR COLORING AN IMAGE ON A SCREEN

[75] Inventors: Masaharu Itoh; Shichiro Miyashita, both of Yamato, Japan

[73] Assignee: International Business Machines Corporation, Armonk, N.Y.

[21] Appl. No.: 442,607

[22] Filed: May 17, 1995

Related U.S. Application Data

[63] Continuation of Ser. No. 989,287, Dec. 11, 1992, abandoned.

[30] Foreign Application Priority Data

Dec. 18, 1991 [JP] Japan ..................... 3-333785

[51] Int. Cl.$^6$ ........................................ G06T 5/00
[52] U.S. Cl. ................................................. 395/131
[58] Field of Search ....................... 395/131, 129, 395/155, 127; 345/114–116

[56] References Cited

U.S. PATENT DOCUMENTS

| | | | |
|---|---|---|---|
| 5,103,407 | 4/1992 | Gabor | 391/131 |
| 5,249,263 | 9/1993 | Yanker | 395/131 |
| 5,317,678 | 5/1994 | Okawara et al. | 395/130 |
| 5,432,897 | 7/1995 | Hwong et al. | 395/129 |

FOREIGN PATENT DOCUMENTS

| | | |
|---|---|---|
| 0403120 | 5/1990 | European Pat. Off. . |
| 63-316224 | 12/1988 | Japan . |

*Primary Examiner*—Mark K. Zimmerman
*Assistant Examiner*—Rudolph Buchel
*Attorney, Agent, or Firm*—Paul S. Drake; Volel Emile

[57] ABSTRACT

A data processing apparatus for generating a desired color image by use of an easy user interface. The user interface includes a screen and an input apparatus having at least a pointer control apparatus. The pointer control apparatus is used for controlling the position of a pointer on the screen, coloring the pointer in a first color in response to the input apparatus, moving the pointer to a desired position on the screen in response to the pointer control apparatus, and changing the color of an area pointed by the pointer, in response to the input apparatus, into the color which is under the influence of the first color.

6 Claims, 6 Drawing Sheets

METHOD AND APPARATUS FOR COLORING AN IMAGE ON A SCREEN

This is a continuation of application Ser. No. 07/989,287, now abandoned, filed Dec. 11, 1992.

TECHNICAL FIELD

This invention relates to a method for painting an image such as an area, a picture, a letter, and an object on a screen in a desired color in a data processing apparatus.

BACKGROUND ART

There are conventional methods for generating and displaying a color image on a screen in a data processing apparatus. Recently, the improvement in hardware has been enhanced to enable the display of a variety of colors on the screen. However, the conventional user interface for painting an image in desired color has not yet been known. For example, Japanese PUPA (Published Unexamined Patent Application) No.3-25687 discloses a method for producing user's desired colors from a great many colors capable of being produced and displayed by hardware. However, the method needs the preparation of an image color block (a kind of palette) occupying most of the areas on a screen, and an operation of coloring an objective image in a desired colors on the screen after the desired color was produced by using the image color block, independently of an operation of producing the desired color.

DISCLOSURE OF THE INVENTION

One object of this invention is to provide a method and an apparatus for painting or generating a desired color image on a screen using an easy user interface.

To achieve the above object, in a data processing apparatus including a screen and input apparatus having at least a pointer control apparatus for controlling the position of a pointer image on the screen, a method for generating a color image, including coloring the pointer in a first color in response to the input apparatus, moving the pointer image to a desired position on the screen in response to the pointer control apparatus, and altering the color of an objective area pointed by the pointer into color which is under the influence of the first color, in response to the input apparatus.

A data processing apparatus according to the present invention includes a display apparatus and input apparatus having at least a pointer control apparatus for controlling the position of a pointer image on a screen in the display apparatus, the data processing apparatus including an apparatus for coloring the pointer in a first color in response to the input apparatus and an apparatus for altering the color of an objective area pointed by the pointer image into the color which is under the influence of the first color, in response to the input apparatus.

BRIEF DESCRIPTION OF THE DRAWING

A further understanding of the nature and advantages of the present invention may be realized by reference to the remaining portions of the specification and the drawings.

BEST MODE OF CARRYING OUT THE INVENTION

Figure 2:
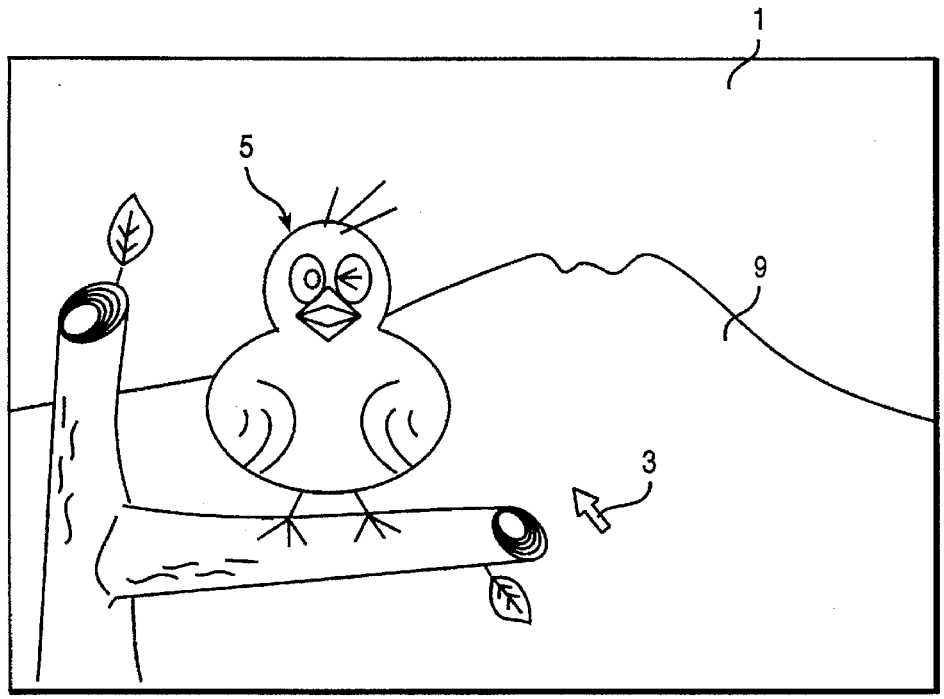
FIG. 2 is a front view showing the image of said embodiment of a screen.
Figure 3:
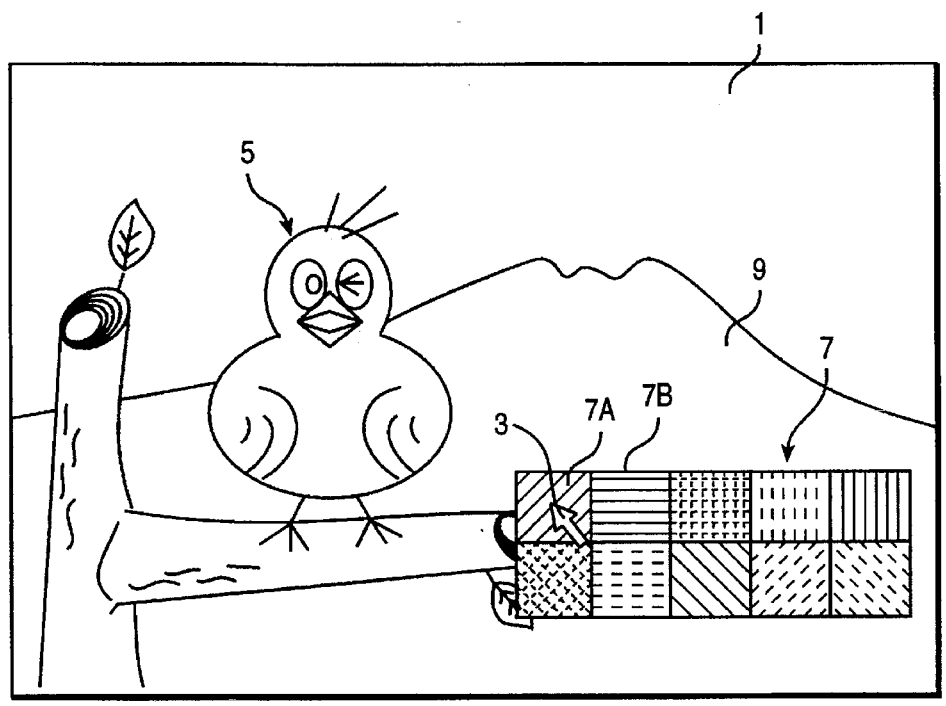
FIG. 3 is a front view showing the image of said embodiment on a screen.

In the following, an embodiment of the present invention is described by reference to drawings. FIG. 2 through FIG. 7 show the screen in one embodiment of this invention. In FIG. 2, a cursor or a pointer image 3 is displayed at an initial or default position on a screen 1. An objective area image 5 which is to be colored in a desired color and a background image 9 are also displayed on the screen 1. As shown in FIG. 3, a window for a color block array 7 is displayed in an area on the screen 1. The color block array 7 is composed of a plurality of color blocks 7A, 7B, etc.. The number of the different colors in the block array 7 may not be required to be large, because an operator may make many different colors based on the small number of different colors, according to this invention. To turn the pointer 3 into a first color, the pointer 3 is moved onto the position of one of the color blocks 7A, 7B, etc. which is in the first color, and a left button of a mouse for example clicked. After coloring the pointer 3 in the first color, the color block array 7 may be erased from the screen 1.

Figure 4:
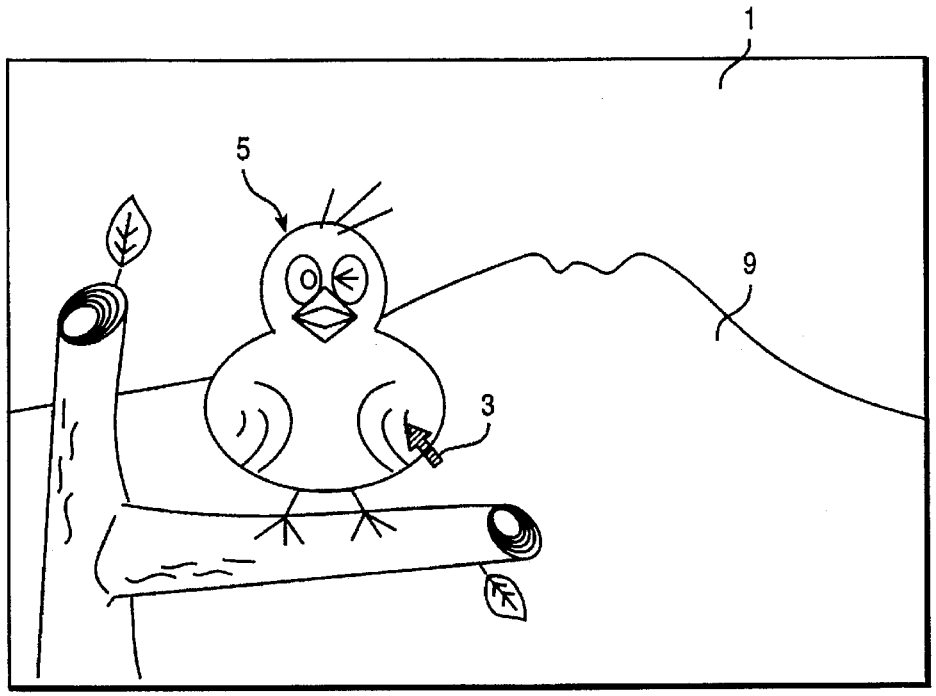
FIG. 4 is a front view showing the image of said embodiment of a screen.
Figure 5:
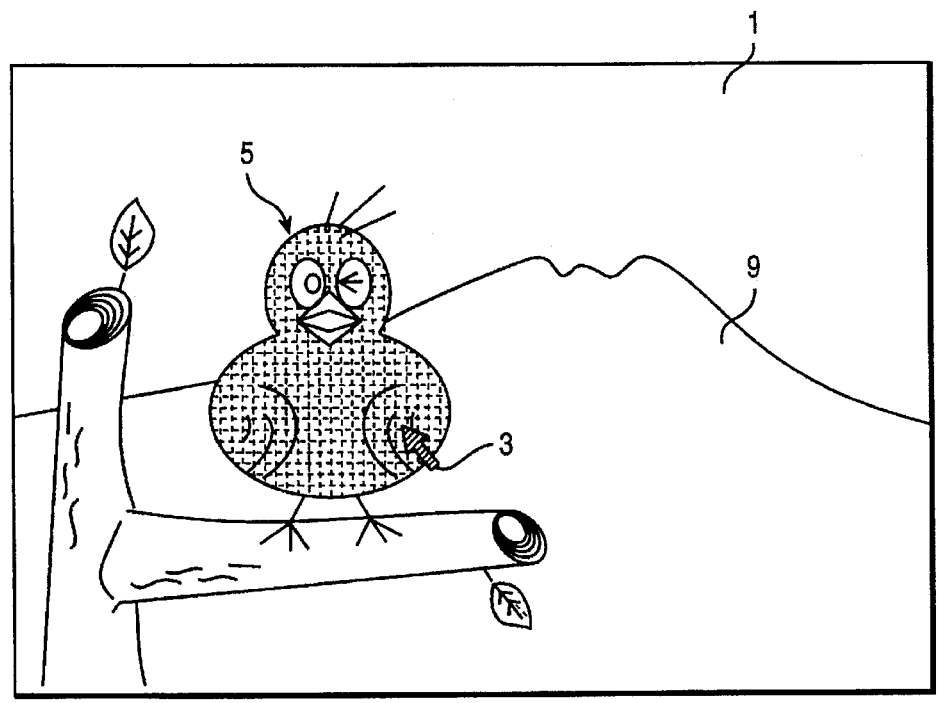
FIG. 5 is a front view showing the image of said embodiment on a screen.
Figure 6:
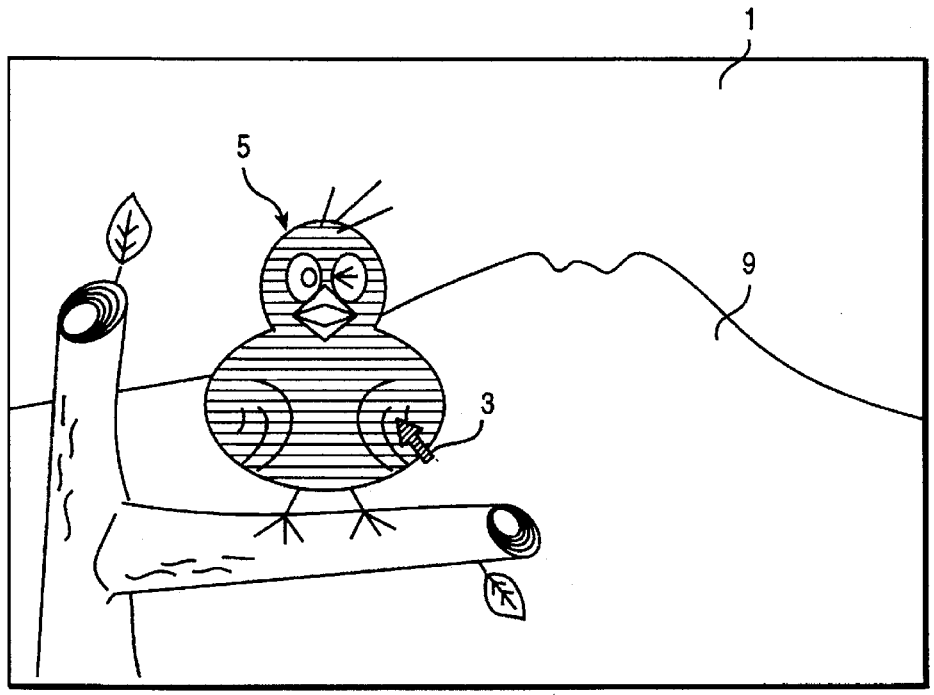
FIG. 6 is a front view showing the image of said embodiment on a screen.

As shown in FIG. 4, the pointer 3 which is already colored in the first color is moved onto the position of the objective image 5. Now it is assumed that the objective image 5 is already in a second color. In FIG. 5, if the left button of the mouse is clicked in the state that the pointer is still positioned on the objective image 5, the color (the second color) of the objective image 5 is altered into a third color. This third color is obtained under the influence of the color (the first color) of the pointer 3. For example, if the pointer 3 is in red (the first color) and the objective image 5 is in blue (the second color), the color of the objective image 5 will become violet when the left button of the mouse is clicked and the pointer 3 is positioned on the objective image 5. If the left button of the mouse is clicked again, the color of the object image 5 will be changed, as shown in FIG. 6, to a violet which is nearer to red than before. That is, the more times the left button of the mouse is clicked, the more the color of the objective image 5 approaches the color of the pointer 3. In other words, the more the number of times of clicking the mouse increases, the more the influence of the color of the pointer 3 extends to the color of the objective image 5. The operator can visibly observe how the visual impression of the whole screen is changing under the influence of the color changing in the objective image 5, during the operation for changing the color in the objective image 5, according to this invention.

Figure 7:
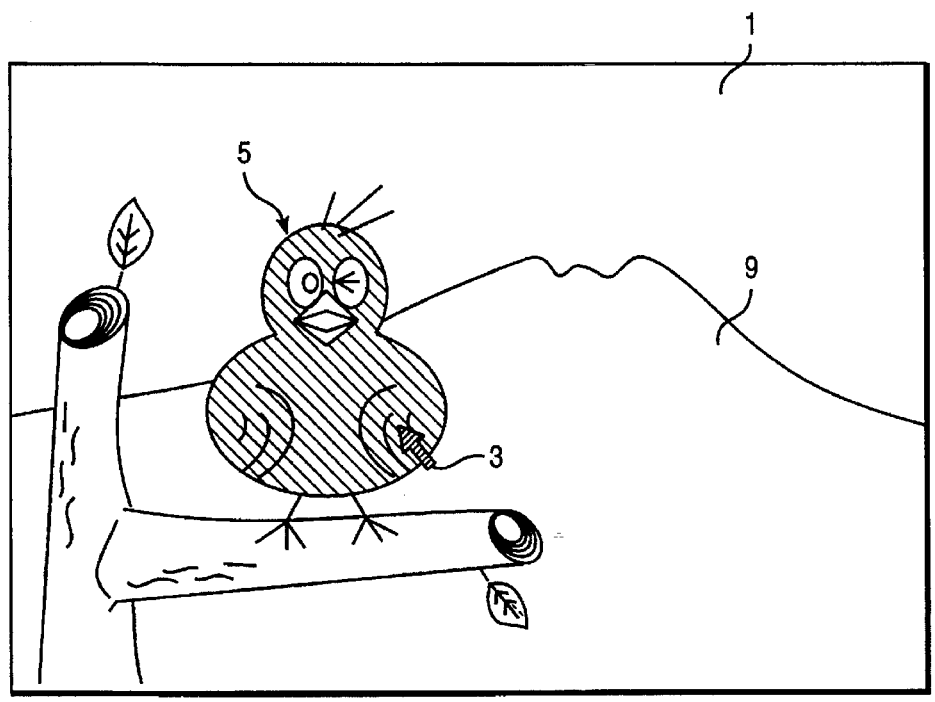
FIG. 7 is a front view showing the image of said embodiment on a screen.

While in the above embodiment the degree of the influence by the second color against the first color is determined by the number of the clicking action, but the degree of that may be determined by the time duration during which the click button is kept depressed. Once the color of the objective image 5 was altered to the color which is under the influence of the color of the pointer 3 in a certain degree, the operator may decrease the degree of the influence by the color of the pointer 3 by clicking the right button of the mouse. As shown in FIG. 7, when the right button of the mouse is clicked, the color of the objective image 5 changes to the color from which the influence by the color of the pointer 3 is removed in a predetermined degree. The degree of the reduction of the influence by the color of the pointer 3 in the objective image 5 may be controlled in accordance with not only the clicking times but also clicking time duration.

Figure 8:
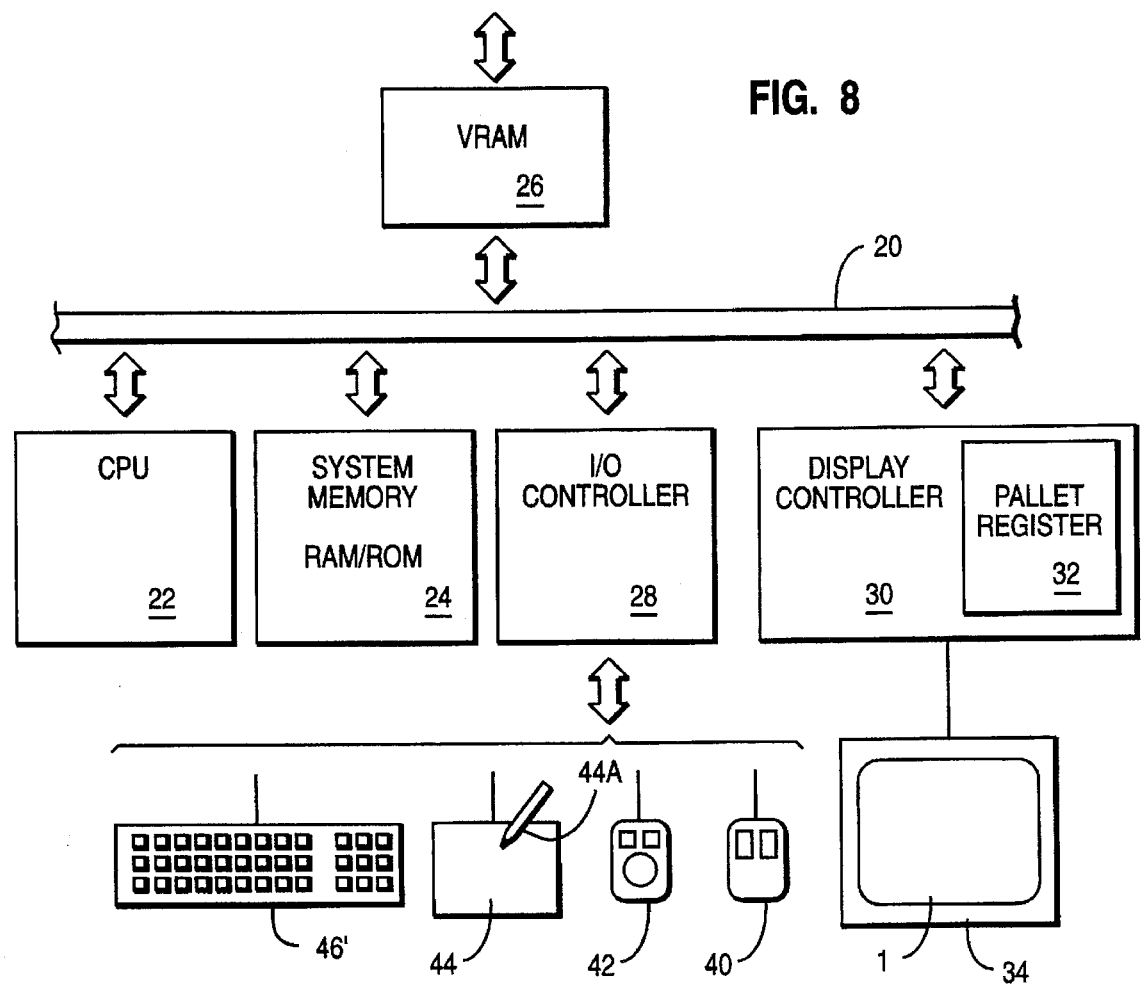
FIG. 8 is a block diagram showing the configuration of a data processing apparatus of an embodiment according to the present invention.

FIG. 8 shows an embodiment of a data processing apparatus according to this invention. In this figure, a system bus 20 is connected to a CPU 22, a system memory 24, a video buffer memory (VRAM) 26, an I/O controller 28, and a display controller 30. The I/O controller 28 is connected to one or more of a mouse 40, a track ball 42, tablet-type input apparatus 44 such as a digitizer, a touch panel sensor, etc. a keyboard apparatus 46. The display controller 30 is connected to a display apparatus 34 which has a screen 1. The tablet-type input apparatus 44 may be provided with a stylus pen 44A. The display controller 30 has a palette register 32. The video buffer memory 26 is for storing the attribute values of colors capable of being displayed on the screen 1. Each storage location in the buffer memory 26 corresponds to display locations or pixels on the screen 1. The attribute values do not indicate directly the colors of pixels, but indicates the addresses of the palette register 32. Each of the addresses of the palette register 32 stores an attribute value directly indicating color of pixels.

While in the above the painting operation for the objective image 5 is performed through the usage of the mouse. However, the painting operation may be performed by using the track ball 42. Furthermore, it may be performed by using the tablet-type input apparatus 44. In the painting operation using the tablet-type input apparatus 44, the degree to which the influence of the color (the first color) of the pointer 3 upon the color (the second color) of the objective image 5 may be changed according to the times or the time duration of pressing action of the stylus pen 44A. The degree of the influence by the pointer color onto the objective image 5 may be changed according to the force of the stylus pen 44A applied to the screen portion. If the degree is changed according to the force of the stylus pen 44A, it is required to provide a pressure sensor for detecting the change of the force which the screen portion receives, to either the stylus pen 44A or the tablet-type input apparatus 44, not both.

Further, a painting operation may be performed by using the keyboard apparatus 46. By the use of the space key or keys dedicated to function specification, an operation similar to the operation of the left click button of the mouse 40 may be performed. By operating the shift key or the control key plus a certain alphanumeric key, a painting operation may be performed. Still further, the keyboard apparatus 46 may be provided with keys dedicated to the painting operation.

Figure 9:
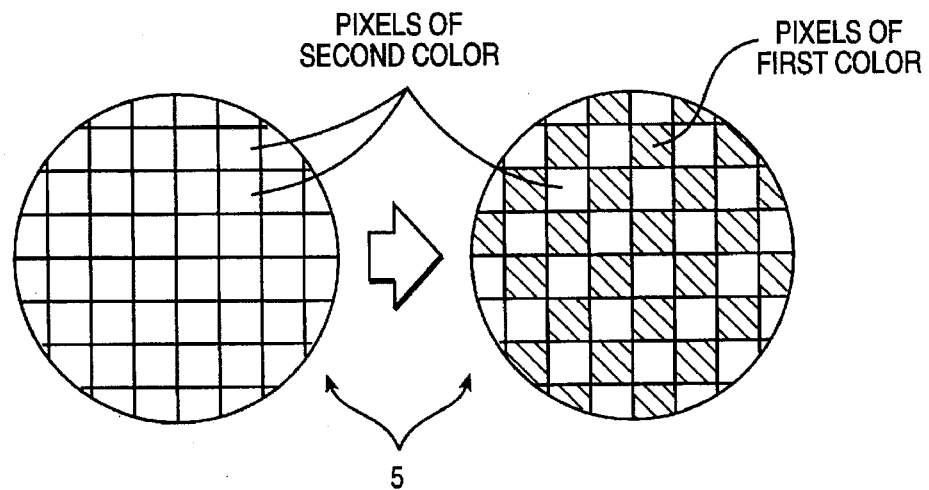
FIG. 9 is a front view showing the change of an enlarged set of pixels of the embodiment of FIG. 8.

FIG. 9 shows an enlarged set of pixels of the screen 1 in the embodiment of FIG. 8 in which the color (the second color) of the objective image 5 changes under the influence of the color (the first color) of the pointer 3. Before the painting operation, the objective image 5 is composed, of only pixels of the second color, but after the painting operation, the objective image 5 is composed of pixels of the second color and pixels of the first color. As the degree to which the influence of the first color over the second color increases, a ratio of the number of the pixels of the first color to the number of the pixels of the second color grows up. After the pixels of the first color are dispersed into the pixels of the second color, the influence of the first color over the second color is visually recognized. The ratio of the first color pixels to the second color pixels by one dispersion process may be changed in accordance with the combination of color characteristics of the first and second colors.

Figure 10:
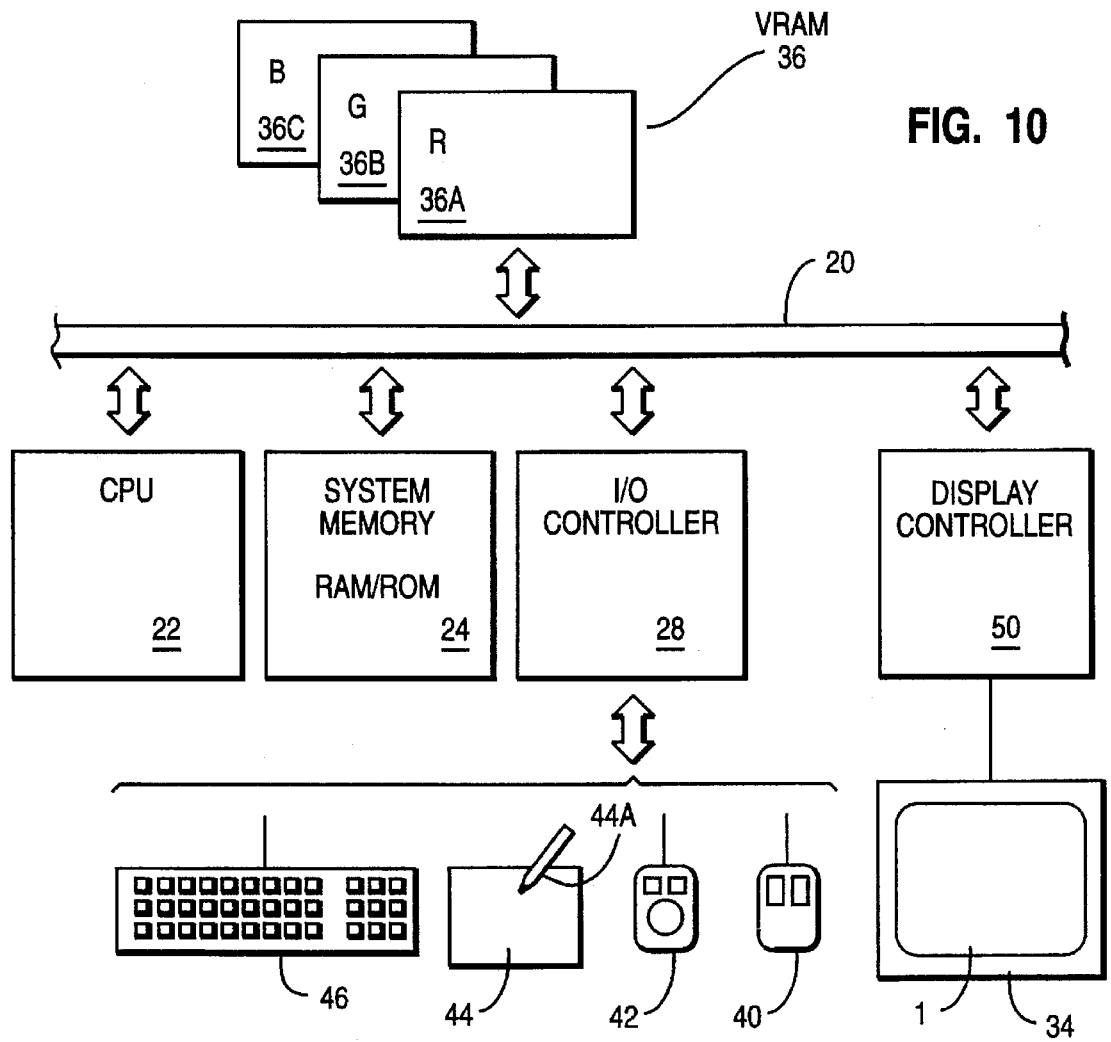
FIG. 10 a block diagram showing the configuration of a second embodiment of a data processing apparatus according to the present invention.
Figure 11:
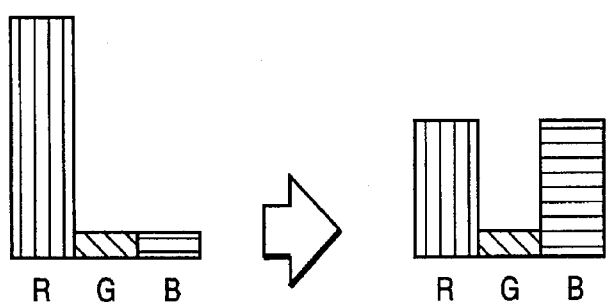
FIG. 11 is a front view showing the change of the intensity of RGB for the pixels of the embodiment of FIG. 10.

FIG. 10 shows another embodiment. In this embodiment, a video buffer memory 36 stores attribute values capable of being displayed on the screen 1 at storage locations corresponding to display positions on the screen 1. The embodiment of FIG. 10 differs from the embodiment of FIG. 8 in that the palette register is not provided and the attribute values in the video buffer memory 36 directly indicate the colors of pixels on the screen 1. FIG. 11 shows the intensity or the brightness of three primary colors (RGB) of pixels on the screen 1 in the embodiment of FIG. 10 at the time when the second color changes under the influence of the first color. In this case, one pixel is composed of three luminous sources of RGB. Since a combination of the intensity of RGB changes for each pixel before and after a painting operation, the color (the second color) of the object image 5 changes to a color obtained under the influence of the color (the first color) of the pointer 3.

Figure 1:
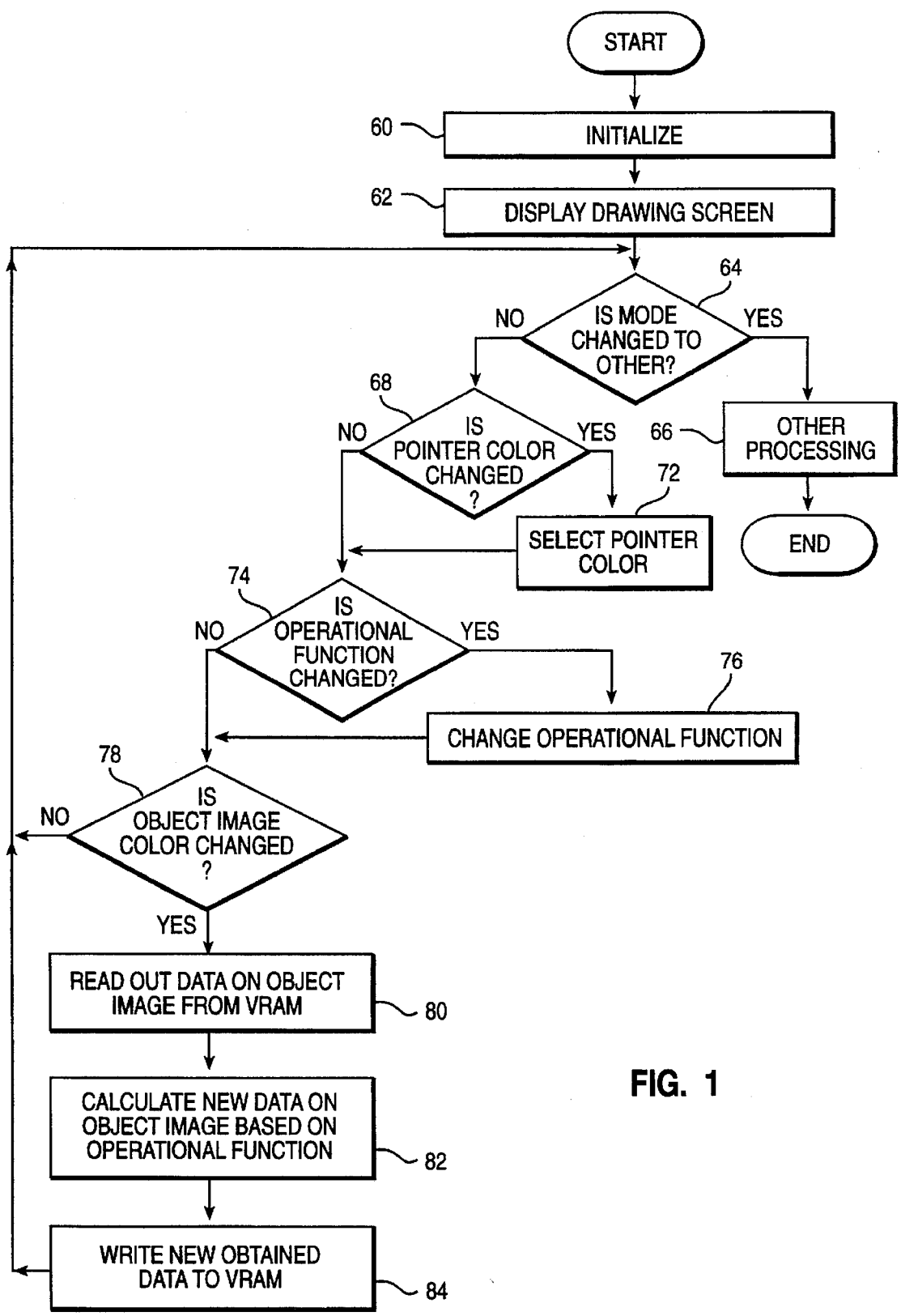
FIG. 1 is a flowchart showing procedures of an embodiment of a method for generating a color image according to the present invention.

FIG. 1 shows a flow chart of an embodiment of a method for painting a color image according to the present invention. In a process block 60, an initialize operation is performed. In a process block 62, a drawing is generated on the screen 1. In a decision block 64, whether or not the painting operation mode is decided. If the painting operation mode is not selected, in a process block 66 some other process is performed and then a terminal operation is performed. If the painting operation mode is selected in the decision block 64, a decision block 68 determines whether or not the color of the pointer 3 is requested to change is decided in a decision block 68. If the color of the pointer 3 is requested, in a process block 72 the color of the pointer 3 is changed. If the color change is not requested or after the color change, in a decision block 74 whether a change in operational function is requested or not is decided.

The above mentioned operational function may be a function for defining how the color (the second color) of the objective image 5 is influenced and changed by the color (the first color) of the pointer 3. Letting the color of the objective image 5 after the painting operation be $C_n$ or ($R_n$, $G_n$, $B_n$), a color of the objective image 5 before the painting operation be $C_v$ or ($R_v$, $G_v$, $B_v$), and a color of the pointer 3 be $C_p$ or ($R_p$, $G_p$, $B_p$), the operational function be F, these colors have the following relation:

$$C_n = (R_n, G_n, B_n) = F(C_v, C_p) = F((R_v, G_v, B_v), (R_p, G_p, B_p))$$

The following is an example of the operational function.

$$F1(C_v, C_p) = ((1/n)*(R_n+R_p), (1/n)*(G_n+G_p), (1/n)*(B_v+B_p))$$

In the above, if n=2, the color (the second color) of the objective image 5 becomes a color which is intermediate between the current color of the object image 5 and the color of the pointer 3 by means of a single step of the painting operation. If the step of the painting operation is repeated again, the color of the object image 5 changes to a color which is intermediate between the color of the objective image 5 obtained by the previous painting operation and the color of the pointer 3. The color of the objective image 5 thus changes gradually towards the color of the pointer 3 according to the number of steps of painting operations.

The following is a further example of the operational function F.

$$F2(C_v, C_p)=((1-w)*(R_n)+w*(R_p),(1-w)*(G_n)+w*(G),(1-w)*(B_v)+w*(B_p))$$

In the above, w (0 <w<1) is a value related to a force received from the stylus pen 44A onto the surface of the tablet 44. The more the stylus force is strong in painting operation, the more the color of the object image 5 becomes near the color of the pointer 3.

The following is a still further example of the operational function F.

$$F3(C_v, C_p)=((1-t)*(R_n)+t*(R_p),(1-t)*(G_n)+t*(G_p),(1-t)*(B_v)+t*(B_p))$$

In the above, t (0<t<1) is a time duration during which the click operation of the mouse 40 continues or the depression of a key on the keyboard apparatus continues or the depression of the stylus pen 44A continues. The longer the time duration, the more the color of the object image 5 changes to a color close to a color of the pointer 3.

In FIG. 1, if an operational function is subjected to change, in a processing block 76 the operational function is changed. After the operational function is changed or not changed, in a decision block 78 whether an operation for changing the color of an area pointed by the pointer is requested or not is determined. If the color change is requested, in a process block 80 attribute values for the area pointed by the pointer are read from the video buffer memory. Then in a process block 82 new attribute values are calculated based on the previously selected operational function. In a process block 84 the new attribute values are stored into the video buffer memory. After the new attribute values are stored into the video buffer memory, the color pointed by the pointer is displayed on the screen 1 based on the new attribute values.

According to the above embodiments, the operator can create the desired color upon the desired area to paint. This painting operation is quite different from the conventional painting operation where the operator creates the desired color outside of the area to paint. Therefore the invention has an advantage of simplicity in operation or an excellent user interface. If the desired color is made outside of the area to paint, it will be necessary to provide color blocks in many colors or a special screen area for mixing or creating colors and therefore a large screen area is occupied for the purpose of only producing the object color. While in the art the color of the objective image should be selected in the state where the objective image is not displayed on the screen. On the contrary, this invention does not need the special area for obtaining the object area, and therefore the drawing area is always displayed to the user. Also in this respect, the embodiment has an advantage of an excellent user interface. Further, the embodiment has a great advantage that the user can determine and confirm the color of the objective image based on visual observation of how the change of a color of the object image exerts on the impressions or tone of the entire screen.

While in the above embodiments, the color of the pointer is decided from the color block array displayed in the window. However, the method or operation for coloring the pointer is not limited to such a method using the color block array, and the pointer may be colored in a predetermined color in response to predetermined key input. Further, while in the above, the entire area (the second color area) of the object image 5 is uniformly under the influence of the color (the first color) of the pointer 3. However, the influence of the color of the pointer 3 may extend to only such a minimum unit of color display as a single color pixel (RGB), an area within the predetermined range wider than said minimum unit, or an area within the predetermined range partially or wholly exceeding the area of the object image 5 on the screen 1. The range to which the influence of the color of the pointer 3 extends on the screen 1 may be the entire range of the screen 1. The influence of the color of the pointer 3 may extend to a range of the same color the screen 1 or do not always need to be limited to the range of the same color, that is, the influence of the color of the pointer 3 may extend to areas of different colors simultaneously.

As described above, according to the present invention, a method for generating a color image and a data processing apparatus, which are excellent in a user interface, can be provided.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for altering a color of a displayed image comprising:

means for coloring a displayed pointer with a first color;

means, using said colored pointer, for selecting an area of said displayed image to be color-altered, said area having a second color different from said first color; and means, based on said first color, for altering said second color in incremental stages, said altering means including means for subtracting said first color from said altered color.

2. The apparatus of claim 1 wherein said means for altering said second color in incremental stages comprises means for changing said second color to said first color by continually adding said first color to said second color.

3. A method of altering a color of a displayed image comprising the steps:

coloring a displayed pointer with a first color;

selecting an area of said displayed image to be color-altered by using said colored pointer, said area having a second color different from said first color; and altering said second color with said first color in incremental stages, said altering step including the step of subtracting said first color from said altered color.

4. The method of claim 3 wherein said step of altering said second color in incremental stages comprises the step of changing said second color to said first color by continually adding said first color to said second color.

5. A computer program product stored on a medium readable by a computer for altering a color of a displayed image comprising:

computer program code means for coloring a displayed pointer with a first color;

computer program code means, using said colored pointer, for selecting an area of said displayed image to be color-altered, said area having a second color different from said first color; and computer program code means, based on said first color, for changing said second color in incremental stages, said computer program code changing means including means for subtracting said first color from said altered color.

6. The computer program product of claim 5 wherein said computer program code means for altering said second color in incremental stages comprises computer program code means for changing said second color to said first color by continually adding said first color to said second color.

* * * * *